United States Patent
Cheng et al.

(10) Patent No.: US 8,197,876 B2
(45) Date of Patent: Jun. 12, 2012

(54) METHOD OF MAKING STANDARD OF IDENTITY CREAM CHEESE THAT IS FLOWABLE AT REFRIGERATED TEMPERATURES

(75) Inventors: Shu Guang (Greg) Cheng, Lancaster, PA (US); Timothy Nellenback, Lititz, PA (US); Jerry L. Fultz, Minneapolis, MN (US)

(73) Assignee: BC-USA, New Holland, PA (US)

( * ) Notice: Subject to any disclaimer, the term of this patent is extended or adjusted under 35 U.S.C. 154(b) by 0 days.

(21) Appl. No.: 13/158,538

(22) Filed: Jun. 13, 2011

(65) Prior Publication Data

US 2011/0244106 A1 Oct. 6, 2011

Related U.S. Application Data

(62) Division of application No. 11/273,689, filed on Nov. 14, 2005, now Pat. No. 7,959,964.

(60) Provisional application No. 60/627,336, filed on Nov. 12, 2004.

(51) Int. Cl.
*A23C 19/00* (2006.01)
(52) U.S. Cl. .......................... 426/582; 426/519; 426/580
(58) Field of Classification Search .................. 426/519, 426/580, 582, 601, 656, 657
See application file for complete search history.

(56) References Cited

U.S. PATENT DOCUMENTS

| | | | |
|---|---|---|---|
| 2,098,765 | A | 11/1937 | Sharpless |
| 2,387,276 | A | 10/1945 | Link |
| 3,072,489 | A | 1/1963 | Hurlburt |
| 3,359,116 | A | 12/1967 | Little |
| 3,397,994 | A | 8/1968 | Elengogen |
| 3,830,947 | A | 8/1974 | Little |
| 4,312,891 | A | 1/1982 | Eisfeldt |
| 4,324,804 | A | 4/1982 | Davis |
| 4,597,971 | A | 7/1986 | Davis |
| 4,980,179 | A | 12/1990 | Koenraads |
| 5,656,320 | A | 8/1997 | Cheng |
| 6,416,797 | B1 | 7/2002 | Han |
| 6,503,553 | B1 | 1/2003 | Flynn |
| 6,835,404 | B2 | 12/2004 | Trecker |
| 7,083,815 | B2 | 8/2006 | Gutknecht |
| 2002/0039613 | A1 | 4/2002 | Bhatia |
| 2004/0076729 | A1 | 4/2004 | Jaskulka |

OTHER PUBLICATIONS

21 C.F.R. 133.133.

*Primary Examiner* — Leslie Wong

(74) *Attorney, Agent, or Firm* — Volpe and Koenig, P.C.

(57) ABSTRACT

A method of producing a standard of identity cream cheese that is flowable at refrigerated temperatures is provided. The method includes providing freshly made or reheated standard of identity cream cheese at a temperature of at least about 150° F. The cream cheese is then cooled while at least intermittently shear mixing the cream cheese. At least some of the shear mixing is carried out while the cream cheese is at a temperature of 70° F. or greater. The flowable standard of identity cream cheese can be converted from a flowable state at refrigerated temperatures to a solid state at refrigerated temperatures by reheating the flowable standard of identity cream cheese to a temperature above 100° F., and cooling the cream cheese to refrigerated temperatures without mixing.

20 Claims, 1 Drawing Sheet

METHOD OF MAKING STANDARD OF IDENTITY CREAM CHEESE THAT IS FLOWABLE AT REFRIGERATED TEMPERATURES

CROSS REFERENCE TO RELATED APPLICATION

This application is a divisional of U.S. patent application Ser. No. 11/273,689, filed on Nov. 14, 2005, now U.S. Pat. No. 7,959,964, which claims the benefit of U.S. Provisional Application No. 60/627,336, filed on Nov. 12, 2004, which are incorporated by reference as if fully set forth.

FIELD OF INVENTION

The present invention relates to standard of identity cream cheese, and more particularly to standard of identity cream cheese that is flowable at refrigerated temperatures and can be used in any baking or food application.

BACKGROUND

As the name indicates, cream cheese is made from pure cream or from mixtures of cream and milk. It has a rich, mildly acidic flavor and a smooth buttery consistency. Traditional methods of manufacturing standard of identity cream cheese start with a cream and milk mixture that is pasteurized, homogenized, and then coagulated using a lactic bacterial culture. The curd is then heated to 125° F.-145° F. (52-63° C.), drained, and hot-packed or cold-packed. Federal Standard of Identity cream cheese is made using this traditional method and the finished product must have a butterfat content of at least about 33% by weight, a total milk solids content of at least about 45% by weight, and not more than 55% moisture by weight (21 C.F.R. §133.133).

Standard of identity cream cheese is stored at refrigerated temperatures and has a thick consistency that is generally similar to butter at refrigerated (32° F.-45° F.) through room (65° F.-75° F.) temperatures, and is not considered flowable (i.e. it is a solid). This makes the product difficult to spread immediately after being removed from a refrigerated environment, for example, for consumption by a consumer on a product such as a bagel or bread. It is also generally difficult to work with in both home and commercial baking applications, for example for use in cheese cake. Conventional cream cheeses are typically only flowable when heated to temperatures above 110° F.

More recent methods of whey-less cream cheese type product manufacturing have been proposed. In these processes, the cream-and-milk mixture has the total solids composition of the cheese. The mixture is also pasteurized, homogenized, and incubated with a lactic bacterial culture at about 86° F. (30° C.). The solidified mixture is then homogenized again and generally packed without cooling. Products which have not been made by the traditional procedure but which meet the standard of identity requirements may be termed "cream cheese" but have a softer, more spreadable consistency due to a higher lactose and lower protein content. However, these products typically exhibit softer textures, burnt surfaces, and undercooked appearances in baking applications. Recently cream cheese manufacturers have began to lower the fat and solids content of their products to get to a softer consistency and terms such as "cream cheese food" or "cream cheese spread" are used.

Soft bodied cream cheese spreads have been formed by non-standard of identity processes by blending a cultured cream cheese dressing with a firm bodied cream cheese curd having homogenized milk fat. The resulting cream cheese can be flowable at refrigerated temperatures. However, cream cheeses made by this method are similarly not suitable for baking applications.

It would be desirable to provide a standard of identity cream cheese product that is flowable at refrigerated temperatures.

SUMMARY

Briefly stated, the present invention is directed to a standard of identity cream cheese that is flowable at refrigerated temperatures (32° F.-45° F.). The cream cheese is made in accordance with federal standard of identity requirements and preferably includes moisture in an amount that is less than about 55% by weight and at least about 33% fat by weight. The cream cheese further includes less than 3% salt by weight, about 4% to about 10% protein by weight, and about 1% to about 7% lactose by weight.

In another aspect, a method of producing a standard of identity cream cheese that is flowable at refrigerated temperatures is provided. The method includes providing freshly made or reheated standard of identity cream cheese at a temperature of at least about 150° F. The cream cheese is then cooled to a temperature below 100° F., or preferably below room temperature, or even more preferably to a refrigerated temperature. The cream cheese is at least intermittently sheared with a mixing device during cooling to disrupt physical bonds that form between the fat globule/protein micelle particles in the cream cheese. Preferably, the cream cheese is continually mixed while rapidly cooling the cream cheese to refrigerated temperatures. However, it is also possible to sequentially mix and cool the heated cream cheese in a number of steps to a temperature below room temperature, and preferably to a refrigerated temperature.

An advantage of the cream cheese in accordance with the present invention that is flowable at refrigerated temperatures is that it performs at parity with the prior known standard of identity cream cheese that is solid at refrigerated temperatures in all known applications, including baking. A further advantage of the cream cheese in accordance with the present invention is that it can be reheated and cooled in order to obtain a standard of identity cream cheese in accordance with the prior known cream cheese that is solid at refrigerated temperatures. This allows a subsequent change in the physical structure of the cream cheese after it is initially processed according to the invention, if necessary, for a particular application.

BRIEF DESCRIPTION OF THE DRAWINGS

The foregoing summary as well as the following detailed description of the preferred embodiments of the present invention will be better understood when reviewed in conjunction with the appended drawings. For the purpose of illustrating the invention, they are shown in the drawings an embodiment which is presently preferred. It should be understood, however, that the invention is not limited to the precise arrangements and instrumentalities shown. In the drawings.

DETAILED DESCRIPTION OF THE PREFERRED EMBODIMENTS

Certain terminology is used in the following description for convenience only and is not considered limiting. The words "a" and "one" are defined as including one or more of the referenced items unless specifically noted.

Figure 1:
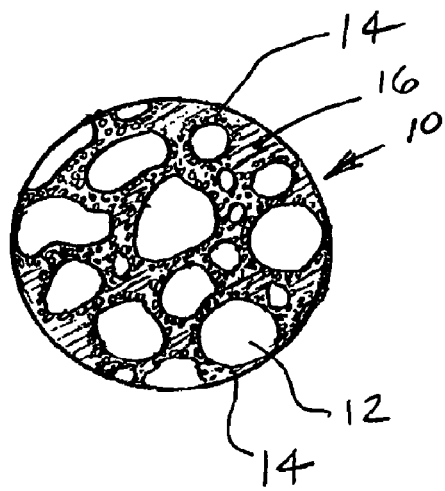
FIG. 1 is a greatly enlarged view of the composition of a standard of identity cream cheese.

Referring to FIG. 1, a greatly enlarged picture of a standard of identity cream cheese is shown. The standard of identity cream cheese 10 is formed in accordance with any acceptable method and preferably includes a moisture content not greater than about 55% by weight, fat in an amount of 33% or more by weight, a pH of about 3.0-5.5, protein in an amount of about 4-10% by weight, lactose in an amount of about 1-7% by weight, and salt in an amount of about 0-3% by weight. The product is formed in accordance with the standard process described in 21 C.F.R. §133.133, incorporated herein by reference, and cooled to a refrigerated temperature either prior to or after packaging. The standard of identity cream cheese 10 includes fat globules 12 surrounded by protein in the form of casein micelles 14. These are contained in an aqueous medium 16, generally represented by cross hatching. While the fat globules 12 may vary in size, generally during cooling of the standard of identity cream cheese, the fat globule/casein micelle particles form physical and/or polar bonds to other fat globule/casein micelle particles. (It is noted that these are not chemical bonds.)

While the specific structure of the casein micelles 14 is not known, the casein micelles 14 generally have a size on the order of 0.1 microns to about 0.04 microns and in theory are represented as having a hairy or open surface area surrounding a more dense core. The protein micelles 14 surround and attach to the fat globules 12, and during cooling lose energy and therefore have a lower activity level which allows them to drop into interlocking contact with neighboring casein micelles 14 or chains of casein micelles 14 on neighboring fat globules 12, resulting in the generally known standard of identity cream cheese which has a generally stiff consistency that can be sliced or cut at refrigerated temperatures (32° F.-45° F.).

The standard of identity cream cheese 10 in accordance with the present invention is flowable at temperatures above 32° F., and in particular at temperatures from about 32° F. to about 110° F. at which conventional standard of identity cream cheeses retain a solid consistency. One of ordinary skill in the art would appreciate that the term "refrigerated temperatures" as used herein includes the range from about 32° F. to 45° F., and can be expanded to include the range of temperatures below room temperatures (i.e. about 32° F. to about 65° F.).

The cream cheese 10 according to the present invention is defined as flowable using any of a number of different viscosity or flow rate measurements. The cream cheese 10 was tested to have an average viscosity of 4008.9 centipoise using a Brookfield Ultra Viscometer with vane spindle number 73 at 45 rpm at 39.6° F.-40.8° F. However, the viscosity of the cream cheese 10 of the present invention using this testing method can range from 1,000 to 8,000 centipoise, and more preferably from 3,000 to 5,000 centipoise over a 5 minute period of time. The cream cheese 10 was also tested to have a viscosity in the range of 10,000 to 400,000 centipoise as measured using a Brookfield Viscometer with RV number 7 spindle at 10 rpm-20 rpm at 40 F with 30 seconds of shear or has a flow rate greater than 10 at refrigerated temperature using the test that follows.

As an alternative measure of flowability, the cream cheese can have a flow rate as defined using a funnel flow test. For example, a stainless steel funnel with a ¾ inch opening on the bottom, 4½ inch diameter on the top, and a length of 3½ inches is provided. A stopper for ⅜ inch of the opening is located in the bottom of the funnel. The funnel is filled and in the tests conducted contained 272.1 grams of product when completely full. After completely filling the funnel with the cream cheese produced according to the invention at 40° F., the funnel was placed over a tared container. The stopper was removed from the bottom of the funnel and the cream cheese 10 according to the invention was allowed to flow into the tared container for a one minute time period. Measurements were made of the amount of the cream cheese 10 according to the invention that has drained through the funnel into the tared container. Test data for two different samples of the product are as follows:

Batch A:
Sample 1: 175.9 grams
Sample 2: 184.0 grams
Sample 3: 179.5 grams
Batch B:
Sample 1: 201.1 grams
Sample 2: 208.2 grams
Sample 3: 200.4 grams Regular standard of identity cream cheese in accordance with the known prior art has a flow of 0 grams using this test. Depending on the specific processing, the flowable cream cheese according to the invention could have a flow rate according to the above-noted test of approximately 10 grams or more providing a flow ratio greater than zero, and preferably on the order of about 100 grams or greater.

The standard of identity cream cheese 10 according to the invention has a preferred moisture content of about 54.5% by weight, a preferred fat content of about 33.5% by weight, a pH of approximately 4.7, salt in an amount of about 1.0% by weight or less, protein in an amount of about 5.0%-6.0% by weight, and lactose in an amount of about 2.0%-3.0% by weight.

While the preferred ingredients of the standard of identity cream cheese 10 according to the invention have been noted, the range of ingredients which comprise the standard of identity cream cheese 10 can be varied. For example, the standard of identity cream cheese 10 can have a moisture content of 30% to 55% by weight, a fat content of 33% or greater by weight, salt in an amount of 0% to 3% by weight, protein in an amount of 4% to 10% by weight, and lactose in an amount of 1% to about 7% by weight.

The cream cheese according to the invention is formed by processing, as described in further detail below, which is believed to break or prevent the formation of the physical bonds between the particles of the known standard of identity cream cheese as it is cooled from a heated temperature. Otherwise, the structure of the cream cheese is the same with the protein micelles 14 surrounding the fat globules 12 with the aqueous medium 16 surrounding the fat globule/protein combinations. Due to processing during formation of the standard of identity cream cheese 10 according to the invention, the outer surface of the protein micelles is believed to be either compacted or smoothed so that the micelles do not connect or interlock with one another or through continued shearing or mixing, the physical bond formation between the protein micelles is disrupted or such physical bonds are broken. This allows the standard of identity cream cheese 10 according to the invention to be flowable at refrigerated temperatures. Additionally, because this is a standard of identity cream cheese product, it can be used in all cream cheese applications, including baking applications for which most non-standard of identity cream cheese spreads are unsuitable.

Figure 2:
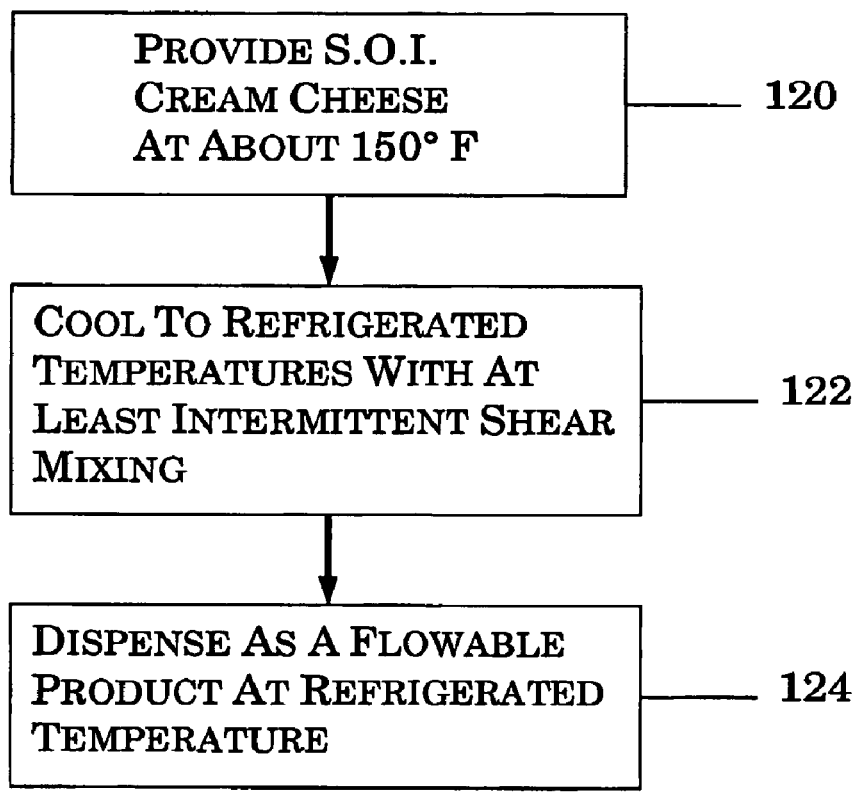
FIG. 2 is a flow chart illustrating the method for producing the standard of identity cream cheese which is flowable at refrigerated temperatures in accordance with the present invention.

The standard of identity cream cheese 10 which is flowable at refrigerated temperature in accordance with the present invention is formed through a process which is believed to break or disrupt the formation of physical bonds between the fat globule/casein micelle particles through shear mixing and cooling of the cream cheese. In the preferred embodiment, as represented in FIG. 2, freshly made or reheated standard of identity cream cheese is provided at a temperature of at least about 150° F., as indicated in Box 120. The cream cheese is then subjected to cooling and shear mixing, at least intermittently or sequentially, or simultaneously, with a shear mixing and cooling device, as shown in Box 122.

In one preferred method, the cream cheese is initially subjected to high shear mixing to raise the temperature of the cream cheese, preferably on the order of 10 to 15° F. The high shear mixing can be carried out on a Breddo LIKWIFIER LORWWSS mixer with a high shear impeller run at 1700 rpm for at least about 10 minutes at a temperature of 170° F. High shear mixing is preferably carried out at a speed of at least 1200 rpm. This high shear mixing increases the temperature by approximately 10° to 15° F. through the shearing process. Although the Breddo LIKWIFIER has proved successful in practicing the invention, the high shear mixing can be carried out by a number of other known devices, such as in-line shear pumps, back pressure valves, scrape surface heat exchangers, blenders or other high shear type devices known in the food processing industry, or it can be omitted entirely depending on the specific processing time and other parameters.

The cream cheese is then cooled while mixing to prevent agglomeration and/or interlocking and physical bonding of the fat globule/casein micelle particles. This can be accomplished using two Votator scrape surface heat exchangers arranged in series running, for example, at approximately 350 rpm. These are used to cool the product anywhere in the range from up to 200° F. to under 100° F., and preferably below room temperature, and more preferably to a temperature of 45° F. or less. While Votators can be utilized, numerous other types of scraped surface heat exchanges, plate heat exchangers, cold jacketed mixing tanks or other cooling devices could be utilized in connection with the continued mixing and cooling operation. While the standard of identity cream cheese according to the invention is preferably cooled to a refrigerated temperature range of 32° F. to 45° F., it can be cooled to any temperature under 100° F. in accordance with the invention. In one example, the cream cheese of the present invention was cooled from 180° F. to about 46° F. at a rate of 2,500 lbs./hour (41.6 lbs./min.). The preferred rate of cooling is in the range of 2° per minute to 60° per minute. The rate of cooling the cream cheese of the present invention could be faster or slower as long as the cream cheese is kept under shear during the cooling process. The shear rate during cooling can be measured in various forms and is preferably between 50 rpm to 5,000 rpm.

Alternatively, standard of identity cream cheese in accordance with the invention that is flowable at refrigerated temperatures has been made using a continuous cooling and mixing process through three sequential Votator scrape surface heat exchangers running, for example, at 350 rpm. It is further believed that the cooling and mixing can be performed in sequential steps, such as mixing for a predetermined time, cooling for a predetermined temperature step, such as 20° F., and then repeating these sequential steps. This is referred to herein as intermittent mixing while cooling, and the cooling process can either continue or be interrupted during the mixing periods. However, the invention requires that at least some of the shear mixing be carried out while the cream cheese is at a temperature of 70° F. or greater, and more preferably above 100° F.

As shown in Box 124, the standard of identity cream cheese which is flowable at refrigerated temperatures in accordance with the present invention is then filled into containers, and remains a flowable product at a refrigerated temperature. While a preferred fill temperature can be in a range of about 55° F., this can be carried out at any temperature in a range of approximately 32° F. to 100° F.

The resulting product is flowable, as determined by: (1) a viscosity on the order of 1,000 to 8,000 centipoise, and more preferably has a viscosity in the range of 3,000 to 5,000 centipoise at 39.6° F. to 40.8° F. using a Brookfield Ultra Viscometer with vane spindle number 73 at 45 rpm, as outlined above; (2) a viscosity on the order of 10,000 to 400,000 centipoise at 40° F., and more preferably has a viscosity of 52,000 to 92,000 centipoise at 40° F., as measured using a Brookfield Viscometer with RV number 7 spindle at 10 rpm-20 rpm, as outlined above; and (3) by measuring a flow rate greater than zero at refrigerated temperatures as outlined above. The cream cheese according the invention is a standard of identity cream cheese which can be more easily packed and transported as a flowable product and can be more easily utilized by commercial or individual consumers as an end product or as an ingredient for baking.

While the exact structure of the standard of identity cream cheese according to the invention, as described above, has not been specifically determined to date, the present disclosure is based on actual experimental tests and the understanding of the cream cheese structure based on the standard of identity cream cheese that is flowable at refrigerated temperatures, as shown by the viscosity or flow rate noted above, that has actually been achieved. The property of being flowable at a refrigerated temperature and the viscosity range and/or flow rate have been observed and measured in a cream cheese 10 produced according to the above-noted method.

Additionally, the cream cheese 10 according to the invention has the further advantage that it can be converted to a standard of identity cream cheese that is solid at refrigerated temperature by re-heating the cream cheese 10 to a temperature above 100° F. and cooling the cream cheese 10 to a refrigerated temperature without mixing. This allows the physical bonds between adjacent fat globule/casein micelle particles to reform through the addition of heat energy and subsequent cooling.

It will be recognized by those skilled in the art that changes can be made to the above-described embodiment of the invention without departing from the broad inventive process and product described above which provide for a flowable standard of identity cream cheese at refrigerated temperatures. It is understood therefore that while the inventors have described the properties of the present invention based on the available data, the invention is not limited to the specifics of the invention as outlined above, but more properly is directed to a standard of identity cream cheese produced using the above-referenced methodology which has a viscosity and/or flow rate at refrigerated temperatures allowing for flowable and/or pumpable transport through various processing and packaging operations. Accordingly, the above disclosure is intended to cover all modifications which are within the spirit and scope of the invention as described and recited in the appended claims.

What is claimed is:

1. A method of producing a standard of identity cream cheese that is flowable at refrigerated temperatures, comprising:

providing freshly made or reheated standard of identity cream cheese at a temperature of at least about 150° F.;

cooling the cream cheese while at least intermittently shear mixing the cream cheese.

2. The method of claim 1, wherein the cream cheese is initially subject to high shear mixing.

3. The method of claim 2, wherein the high shear mixing increases the temperature of the cream cheese in the range of 10° F. to 15° F.

4. The method of claim 2, wherein the high shear mixing is carried out using at least one of the group comprising a high shear impeller, an in-line shear pump, a back pressure valve, a scrape surface heat exchanger, and a blender.

5. The method of claim 2, wherein at least some of the high shear mixing is carried out using a high shear impeller at a speed of at least 1200 rpm.

6. The method of claim 1, wherein the cooling is carried out using at least one of the group comprising a scraped surface heat exchanger, plate heat exchanger, and cold jacket mixing tank.

7. The method of claim 1, wherein a shear mixing rate during cooling is in the range of 50 rpm to 5,000 rpm.

8. The method of claim 1, wherein the cooling is performed simultaneously with the shear mixing.

9. The method of claim 1, wherein the cream cheese is sequentially shear mixed and cooled in a plurality shear mixing and cooling steps.

10. The method of claim 1, wherein the cream cheese is cooled to a temperature in the range of 45° F. to 32° F.

11. The method of claim 1, wherein the cooling is carried out at about 60 degrees per minute to about 2 degree per minute.

12. The method of claim 1, wherein the standard of identity cream cheese comprises:

less than 55% by weight moisture; and at least 33% by weight fat.

13. The method of claim 1, wherein the standard of identity cream cheese further comprises about 5.0% to 6.0% by weight protein and about 2% to 3% by weight lactose.

14. The method of claim 1, wherein the cream cheese has a flow rate greater than 0 at refrigerated temperatures using a funnel flow test over a one minute period.

15. The method of claim 1, wherein the refrigerated temperatures include a range from about 32° F. to about 65° F.

16. The method of claim 1, further comprising the step of dispensing the cream cheese as a flowable product into containers at a temperature in the range of 32° F. to 100° F.

17. The method of claim 1, wherein the shearing step disrupts physical bonds between fat globule particles and casein micelle particles in the cream cheese.

18. The method of claim 1, wherein the cream cheese is cooled to a temperature below 100° F.

19. The method of claim 1, wherein at least some of the shear mixing is carried out while the cream cheese is at a temperature of 70° F. or greater.

20. A method of producing a standard of identity cream cheese that can be converted from a flowable state at refrigerated temperatures to a solid state at refrigerated temperatures, comprising:

preparing the flowable state cream cheese by providing freshly made or reheated standard of identity cream cheese at a temperature of at least about 150° F., and cooling the cream cheese to a temperature below 100° F. while at least intermittently shearing the cream cheese with a mixing device; and preparing the solid state cream cheese by reheating the flowable state cream cheese to a temperature above 100° F., and cooling the cream cheese to refrigerated temperatures without mixing.

* * * * *